United States Patent
Hartmann et al.

(10) Patent No.: US 10,059,058 B2
(45) Date of Patent: Aug. 28, 2018

(54) DEVICE FOR BUILDING A MULTILAYER STRUCTURE WITH STORAGE CONTAINER OR FILLING CONTAINER MOVABLE ALONG THE DISPENSING CONTAINER

(71) Applicant: Voxeljet AG, Friedberg (DE)

(72) Inventors: Andreas Dominik Hartmann, Stadtbergen (DE); Dominik Schmid, Augsburg (DE)

(73) Assignee: VOXELJET AG, Friedberg (DE)

( * ) Notice: Subject to any disclaimer, the term of this patent is extended or adjusted under 35 U.S.C. 154(b) by 877 days.

(21) Appl. No.: 14/405,236

(22) PCT Filed: Apr. 17, 2013

(86) PCT No.: PCT/DE2013/000198
§ 371 (c)(1),
(2) Date: Dec. 3, 2014

(87) PCT Pub. No.: WO2013/189473
PCT Pub. Date: Dec. 27, 2013

(65) Prior Publication Data
US 2015/0110910 A1 Apr. 23, 2015

(30) Foreign Application Priority Data

Jun. 22, 2012 (DE) .................. 10 2012 012 363

(51) Int. Cl.
*B29C 33/54* (2006.01)
*B29C 41/22* (2006.01)
(Continued)

(52) U.S. Cl.
CPC .......... *B29C 67/0085* (2013.01); *B22F 3/003* (2013.01); *B29C 64/153* (2017.08);
(Continued)

(58) Field of Classification Search
CPC ..... B29C 64/20; B29C 64/205; B29C 64/165; B29C 64/393
(Continued)

(56) References Cited

U.S. PATENT DOCUMENTS

| 3,913,503 A | 10/1975 | Becker |
| 4,247,508 A | 1/1981 | Housholder |

(Continued)

FOREIGN PATENT DOCUMENTS

| AU | 720255 B2 | 5/2000 |
| DE | 3221357 A1 | 12/1983 |

(Continued)

OTHER PUBLICATIONS

US 4,937,420, 06/1990, Deckard (withdrawn)
(Continued)

*Primary Examiner* — Joseph S Del Sole
*Assistant Examiner* — Thu Khanh T Nguyen
(74) *Attorney, Agent, or Firm* — The Dobrusin Law Firm, P.C.

(57) ABSTRACT

The invention relates to a device (1) for building a layer body (2) from a plurality of superimposed layers of free-flowing material, in particular particulate material, on a building platform (3) in a build space (4), the layers being solidified and joined to each other in locally predetermined areas, so that at least one layer body (2) is formed by the solidified and joined areas of the layers, including an elongated discharge container (5), which is movable back and forth over the build space (4]) in at least one discharge direction and which has at least one discharge opening (6) from which the free-flowing material is dischargeable in individual superimposed layers during the movement of the discharge container (5), it being possible to supply the discharge container (5) with free-flowing material from a (Continued)

filling device with at least one storage or filling container (10) having at least one outflow opening (11) by vertically covering the at least one outflow opening (11) of the storage or filling container (10) with an elongated feed opening (12) of the discharge container (5).

The invention provides that the storage or filling container (10) has a shorter extension than the discharge container (5), viewed in the longitudinal direction of the discharge container (5), and the storage or filling container (10) is controllable relative to the discharge container (5), viewed in the longitudinal direction of the discharge container (5), in such a way that the outflow opening (11) of the storage or filling container (10) is guided along the feed opening (12) at least once from one end thereof to the other end thereof.

21 Claims, 5 Drawing Sheets

(51) Int. Cl.
    *B29C 67/00* (2017.01)
    *B22F 3/00* (2006.01)
    *B29C 64/153* (2017.01)
    *B29C 64/165* (2017.01)
    *B29C 64/20* (2017.01)
    *B22F 3/105* (2006.01)
    *B33Y 30/00* (2015.01)

(52) U.S. Cl.
    CPC ............ B29C 64/165 (2017.08); B29C 64/20 (2017.08); *B22F 2003/1056* (2013.01); *B33Y 30/00* (2014.12); *Y02P 10/295* (2015.11)

(58) Field of Classification Search
    USPC ...... 425/77, 78, 344–355; 141/71, 250, 280, 141/284
    See application file for complete search history.

(56) References Cited

U.S. PATENT DOCUMENTS

| | | |
|---|---|---|
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A * | 7/1997 | Retallick .................. B22F 3/004 425/174.4 |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A * | 5/1998 | Wilkening .............. B23K 26/34 425/174.4 |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |

(56) References Cited

U.S. PATENT DOCUMENTS

| | | |
|---|---|---|
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Fan et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom et al. |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Ederer et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1 | 12/2005 | Russell et al. |
| 2005/0283136 A1 | 12/2005 | Skarda |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |
| 2006/0145381 A1* | 7/2006 | Larsson ............... B29C 64/153 425/174.4 |
| 2006/0159896 A1 | 7/2006 | Pfeifer et al. |
| 2006/0176346 A1 | 8/2006 | Ederer et al. |
| 2006/0208388 A1 | 9/2006 | Bredet et al. |
| 2006/0237159 A1 | 10/2006 | Hochsmann |
| 2006/0251535 A1 | 11/2006 | Pfeifer et al. |

(56) References Cited

U.S. PATENT DOCUMENTS

| | | |
|---|---|---|
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1* | 10/2007 | Baumann ............ B29C 67/0077 430/325 |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0035411 A1* | 2/2009 | Seibert ................... B29C 31/02 425/174 |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0207288 A1 | 8/2010 | Dini |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer et al. |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grassegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0197367 A1 | 7/2017 | Ederer et al. |
| 2017/0210037 A1 | 7/2017 | Ederer et al. |
| 2017/0217098 A1 | 8/2017 | Hartmann et al. |
| 2017/0297263 A1 | 10/2017 | Ederer et al. |
| 2017/0305139 A1 | 10/2017 | Hartmann |
| 2017/0326693 A1 | 11/2017 | Ederer et al. |
| 2017/0355137 A1 | 12/2017 | Ederer et al. |

FOREIGN PATENT DOCUMENTS

| | | |
|---|---|---|
| DE | 3930750 C2 | 3/1991 |
| DE | 4102260 A1 | 7/1992 |
| DE | 4305201 C1 | 4/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 20122639 U1 | 11/2006 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102009056696 A1 | 6/2011 |
| DE | 102011053205 A1 | 3/2013 |
| DE | 102015006363 A1 | 12/2016 |
| DE | 102015008860 A1 | 1/2017 |
| DE | 102015011503 A1 | 3/2017 |
| DE | 102015011790 A1 | 3/2017 |
| EP | 361847 B1 | 4/1990 |
| EP | 0431924 B1 | 6/1991 |
| EP | 1415792 | 5/2004 |
| EP | 1457590 A | 9/2004 |
| EP | 1872928 A1 | 6/2007 |
| EP | 1381504 B1 | 8/2007 |
| GB | 2297516 A | 8/1996 |
| JP | S62275734 | 11/1987 |
| JP | 2003136605 A | 5/2003 |
| JP | 2004082206 A | 3/2004 |
| JP | 2009202451 A | 9/2009 |
| WO | 01/40866 A2 | 6/2001 |
| WO | 2001/078969 A2 | 10/2001 |
| WO | 2004/014637 A1 | 2/2004 |
| WO | 2005/097476 A1 | 10/2005 |
| WO | 2006/100166 A1 | 9/2006 |
| WO | 2008/049384 A1 | 5/2008 |
| WO | 2008061520 A2 | 5/2008 |
| WO | 2010/149133 A1 | 12/2010 |
| WO | 2011063786 A1 | 6/2011 |
| WO | 2013075696 A1 | 5/2013 |
| WO | 2014090207 A1 | 6/2014 |

(56) References Cited

FOREIGN PATENT DOCUMENTS

| | | |
|---|---|---|
| WO | 2014166469 A1 | 10/2014 |
| WO | 2015078430 A1 | 6/2015 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015149742 A1 | 10/2015 |
| WO | 2015180703 A1 | 12/2015 |
| WO | 2016019937 A1 | 2/2016 |
| WO | 2016019942 A1 | 2/2016 |
| WO | 2016058577 A1 | 4/2016 |
| WO | 2016095888 A1 | 6/2016 |
| WO | 2016101942 A1 | 6/2016 |
| WO | 2016146095 A1 | 9/2016 |

OTHER PUBLICATIONS

International Search Report, Application No. PCT/DE2013/000198, dated Aug. 14, 2013.
International Preliminary Report on Patentability and Translation of Written Opinion of the International Search Authority, Application No. PCT/DE2013/000198, dated Dec. 23, 2014.
Marcus et al., Solid Freedom Fabrication Proceedings, Nov. 1993.
Cima et al., "Computer-derived Microstructures by 3D Printing: Bio- and Structural Materials," SFF Symposium, Austin, TX, 1994.
Marcus, et al., Solid Freeform Fabrication Proceedings, Sep. 1995, p. 130-33.
Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143151, Jan. 1990.
Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?".

* cited by examiner

DEVICE FOR BUILDING A MULTILAYER STRUCTURE WITH STORAGE CONTAINER OR FILLING CONTAINER MOVABLE ALONG THE DISPENSING CONTAINER

BACKGROUND INFORMATION

The invention relates to a device for building a layer body from a plurality of superimposed layers of free-flowing material, in particular particulate material, on a building platform in a build space, the layers being solidified and joined together in locally predetermined areas through the action of a binder, so that at least one molding is formed by the solidified and joined areas of the layers, including an elongated discharge container, which is movable back and forth over the build space in at least one discharge direction and which has at least one discharge opening from which the free-flowing material is dischargeable in individual superimposed layers during the movement of the discharge container, it being possible to supply the discharge container with free-flowing material from a filling device with at least one storage or filling container having at least one outflow opening by vertically covering the at least one outflow opening of the storage or filling container with an elongated feed opening of the discharge container, according to the definition of the species in Patent Claim 1.

A computer-controlled method for producing three-dimensional moldings is described in EP 0 431 924 B1. Free-flowing particulate material is applied in a thin layer to a build space which is surrounded by container walls and is disposed on a building platform, and subsequently a binder is selectively printed thereon, using a print head, according to computer data. The particle area onto which the binder is printed sticks together and solidifies under the influence of the binder and, if necessary, an additional hardener. The building platform is then lowered by a distance of one layer thickness into a build cylinder and provided with a new layer of particulate material, which is also printed as described above. These steps are repeated until the desired height of the molding is achieved. A three-dimensional object is thereby produced from the printed and solidified areas.

After it is completed, the molding produced from solidified particulate material is embedded in loose particulate material and is subsequently removed therefrom. This is done, for example, using an extractor. This leaves the desired molding, from which the remaining adhering particles are removed, for example by brushing.

Other powder-supported rapid prototyping processes work in an identical or similar manner, for example, selective laser sintering or electron beam melting, in which loose particulate material is also applied in layers and selectively solidified with the aid of a controlled physical radiation source. The aforementioned methods are summarized under the terms, "additive manufacturing," "three-dimensional printing" or "3D printing."

EP 1 872 928 A1 proposes to raise the discharge container and the print head relative to the building platform instead of lowering the building platform relative to the discharge container and print head as the layering process progresses for building larger three-dimensional moldings. For this purpose, the discharge container is designed as a dosing device which may undergo controlled activation and deactivation for the controlled output of a predetermined, preferably constant, linear volume flow of particulate material per length unit and per time unit, so that particulate material is not unnecessarily strewn around the molding to be built or is not "emptied" prematurely and thus does not lose its function while the layer is being deposited. However, such dosing-controlled and "intelligent" discharge containers have a relatively complex structure and are correspondingly expensive.

"Unintelligent" discharge containers of a simpler design, on the other hand, are unable to dose particulate material in a targeted manner or are not switchable. For example, they include a scraper moving in the discharge direction or a counter-rotating roller or an oscillating blade. These devices then distribute a quantity of material in front of the discharge container on the build space in the discharge direction. The amount of particulate material then has to be sufficiently measured before the discharge container travels over the build space.

In order for the process to progress as described, the discharge container must pass completely over the area to be coated or the build space. The length of the discharge container therefore corresponds to the length of the build space. "Length of the discharge container" is understood below to be the largest dimension or the longest extension of the discharge container.

Discharge containers are therefore usually designed as an elongated beam having a hopper-shaped cross section and having a slot on the underside as the discharge opening for discharging particulate material. The longitudinal extension of the discharge container is then perpendicular to its discharge direction. The storage or filling container then has the function of filling the discharge container with the free-flowing material up to a desired fill level evenly and without losses over its entire length.

A beam-shaped storage or filling container is described in the generic WO 2010/149133 A1, which is provided with a hopper-shaped cross section, viewed on a plane perpendicular to the longitudinal direction, and which has the same length as the discharge container to be filled.

To be filled, the discharge container then passes under the storage or filling container at one end of the build space. The storage or filling container is emptied into the discharge container by means of a sliding closure of the outflow opening, which is provided with a grate, on its underside. Since the sliding closure extends over the entire length of the storage or filling container, it has a long and narrow structural design. This promotes the tendency of the sliding closure to become jammed. In addition, a relatively large amount of energy must be expended to move the sliding closure.

In WO 2005/097476 A1, the discharge container is filled with the aid of nozzles, which are moved along the discharge container. The nozzles are connected to a storage tank by flexible hoses. The powder is transported from the tank to the nozzle with the aid of a pump. To be able to move the hoses without kinking, the building device must have a certain height, which, however, causes the building device to have a large structural design. Transporting the powder in hoses is furthermore considered to be negative, due to high internal friction and siphon effects. If ribbed hoses are used to improve the mobility of the hoses, a high degree of contamination must be expected. If damp powder material is used, which tends to stick, cleaning the hoses becomes very complicated. During the movement of the hoses, pumping effects furthermore occur, which may compress the powder material, which, in turn, increases friction and impairs transport. Undesirable clumping may also occur. In addition, the delivery route from the storage tank to the nozzles is relatively long, and the powder comes into contact with the inner walls of the hoses, whereby the physical properties of the powder may change. Not least, to avoid overfilling the discharge container, either the pump must regulate the powder flow or the ratio between the powder flow and the speed at which the nozzles move must be controlled. However, both options require a great deal of control complexity, including additional sensors.

The object of the invention is therefore to refine a device of the type mentioned at the outset in such a way that a reliable filling of the discharge container is facilitated while maintaining a simple and cost-effective design.

SUMMARY OF THE INVENTION

According to the invention, it is provided that the storage or filling container has a shorter extension than the discharge container, viewed in the longitudinal direction of the discharge container, and the storage or filling container is controllable relative to the discharge container, viewed in the longitudinal direction of the discharge container, in such a way that the outflow opening of the storage or filling container is guided along the feed opening at least once from one end thereof to the other end thereof.

As mentioned above, "length" or "longitudinal extension" of the discharge container is understood to be the largest dimension of the discharge container. This longitudinal direction is generally perpendicular to the discharge direction of the discharge container.

In other words, according to the invention, the free-flowing material in the storage or filling container is transported and discharged in the form of compact feedstock. As a result, the free-flowing material undergoes very little mixing or tumbling, so that minimal negative influences on the free-flowing material occur, e.g., through electrostatic charging, absorption or discharge of moisture or oxidation. As feedstock in the storage or filling container, which is relatively short or, more precisely, shorter than the discharge container, the free-flowing material presents only a small amount of surface to the environment, so that the physical properties of the free-flowing material undergo very little change, e.g., due to evaporation of a component or cooling.

Therefore, with the aid of the invention, a linear filling of the discharge container is accomplished, which is able to fill the discharge container variably along its longitudinal extension. In the case of boxless building, i.e., building without build walls, the size of the build space is steplessly variable. In building devices which are not easily accessible from certain sides, the invention provides the advantage that the storage and filling container may be moved into a position which, with regard to its accessibility, is more favorable for being filled or cleaned.

On the whole, the movable storage or filling container may thereby be easily cleaned, and the discharge container may be easily filled by the storage and filling container up to a standard level, regardless of the present fill level.

Advantageous refinements of and improvements to the invention specified in the independent claims are made possible by the measures discussed in the dependent claims.

The storage or filling container is particularly preferably positively controlled along a discharge route extending between a starting position on the one end of the feed opening of the discharge container and a reversing position at the other end of the feed opening of the discharge container. As a result, the entire available fill volume of the discharge container is covered by the storage and filling container.

The starting position of the storage or filling container is preferably a filling position at which the storage or filling container is fillable or refillable with free-flowing material with the aid of a filling device.

According to one refinement, the at least one outflow opening of the storage or filling container may be disposed at a level which essentially lies at a fill level to be attained for the free-flowing material in the discharge container, in order to close this at least one outflow opening at the current position of the at least one outflow opening on the discharge route upon reaching the fill level to be attained by the free-flowing material already introduced into the discharge container along a section of the discharge route already traveled. A so-called "material cone seal" is thus implemented, in which the material cone of the free-flowing material already discharged into the discharge container prevents further outflow at the current position of the discharge route through a buildup of material, and additional free-flowing material may flow out only when the storage and filling container moves forward until the material cone again prevents the outflow at this position then reached. In this manner, a dosing device is not needed on the storage and filling container because a desired fill level is always reached. Those skilled in the art may easily determine the suitable speed of the storage and filling container relative to the discharge container by testing or calculation.

To avoid the loss of free-flowing material when the storage or filling container has reached or passed slightly beyond the reversing position, in which case the danger exists that the at least one outflow opening of the storage and filling container is no longer situated (completely) over the feed opening of the discharge container, a closing member may be disposed in the area of the reversing position of the storage or filling container in such a way that the closing member closes the outflow opening when the at least one outflow opening of the storage or filling container is positioned over the closing member.

The storage or filling container movable relative to the discharge container is particularly preferably fillable, dimensioned and/or controlled in such a way that the discharge container is fillable up to a fill level to be attained based on a single one-way trip of the storage or filling container from the starting position to the reversing position, based on a single round trip of the storage or filling container from the starting position to the reversing position and back or based on multiple trips along the discharge route.

Preferably, the feed opening of the discharge container essentially extends over the entire length of the discharge container, if the side walls of the discharge container are designed accordingly.

According to one variant, the storage or filling container is situated in a stationary manner, viewed in the discharge direction or in the longitudinal direction of the discharge container, and the discharge container is able to pass under the storage or filling container.

According to another variant, the storage or filling container is able to move together with the discharge container, viewed in the discharge direction or in the longitudinal direction of the discharge container. In this case, the storage or filling container may be positioned relative to the discharge container, viewed in the vertical direction, in such a way that the level of the outflow opening of the storage or filling container is disposed under the level of an upper edge of the feed opening of the discharge container. This effectively prevents an outflow of feedstock material to the outside of the discharge container on the edge thereof.

According to a refinement, the storage or filling container may have a hopper-shaped cross section, the outflow opening being disposed on the hopper end. The cross section of the storage and filling container is particularly preferably provided with a hopper-shaped design, both on a plane perpendicular to the longitudinal extension of the discharge container and on a plane which contains the longitudinal axis of the discharge container and is oriented vertically. The cross section of the storage or filling container may furthermore be provided with a square or rectangular design on a horizontal plane, in the case of a rectangular cross section, the longer side being disposed parallel to the discharge container and yet shorter than the design thereof.

The outflow of free-flowing material from the storage or filling container into the discharge container may preferably take place with the aid of at least one of the following units, individually or in combination with each other:

- a unit for generating pressure and/or vibrations in the free-flowing material stored in the storage or filling container for the purpose of placing the free-flowing material from a non-flowing state into a flowing state, in which it is able to flow through the at least one outflow opening, by introducing pressure and/or vibrations;
- a unit for either opening or closing the at least one outflow opening of the storage or filling container;
- a unit for activating and deactivating a suction acting upon the free-flowing material stored in the storage or filling container, in such a way that
  - when the suction is activated, the free-flowing material is prevented, on the one hand, by a sieve-like or fabric-like structure, from flowing out in the direction of the suction and, on the other hand, from flowing out through the at least one outflow opening;
  - when the suction is deactivated, the free-flowing material stored in the storage or filling container flows out through the at least one outflow opening;
- a rotary feeder unit.

The storage or filling container is preferably guided relative to the discharge container along a linear guide and driven by driving means, such as a rotary drive motor (e.g., an electric motor), combined with a gear such as a lead screw drive, a toothed belt gear, a cable gear. Alternatively the storage or filling container may also be driven linearly and directly by a cylinder piston drive such as a pneumatic cylinder. The driving means of the movable storage and filling container is controlled, for example, by an electronic control unit.

From time to time, deposits of free-flowing material must be removed from the discharge opening or the underside of the discharge container. In building devices according to the prior art, separate cleaning devices are provided for this purpose, for example in the form of brushes, sponges, blades, felt strips or rotating brush rollers, felt lamella rollers or sponge rollers, which are guided on a separate linear guide, movably disposed along the discharge container.

A cleaning device for the underside or for the discharge opening of the discharge container is advantageously attached to the storage or filling container, which is movable relative to the discharge container. The cleaning device then moves together with the storage and filling container as one structural unit, and a separate linear guide for the cleaning device no longer has to be provided.

Additional measures which improve the invention are illustrated in greater detail below together with the description of one exemplary embodiment of the invention on the basis of the drawing.

BRIEF DESCRIPTION OF THE DRAWING

Exemplary embodiments of the invention are illustrated below in the drawing and explained in greater detail in the following description. In the drawing.

DETAILED DESCRIPTION OF THE INVENTION

Figure 1A:
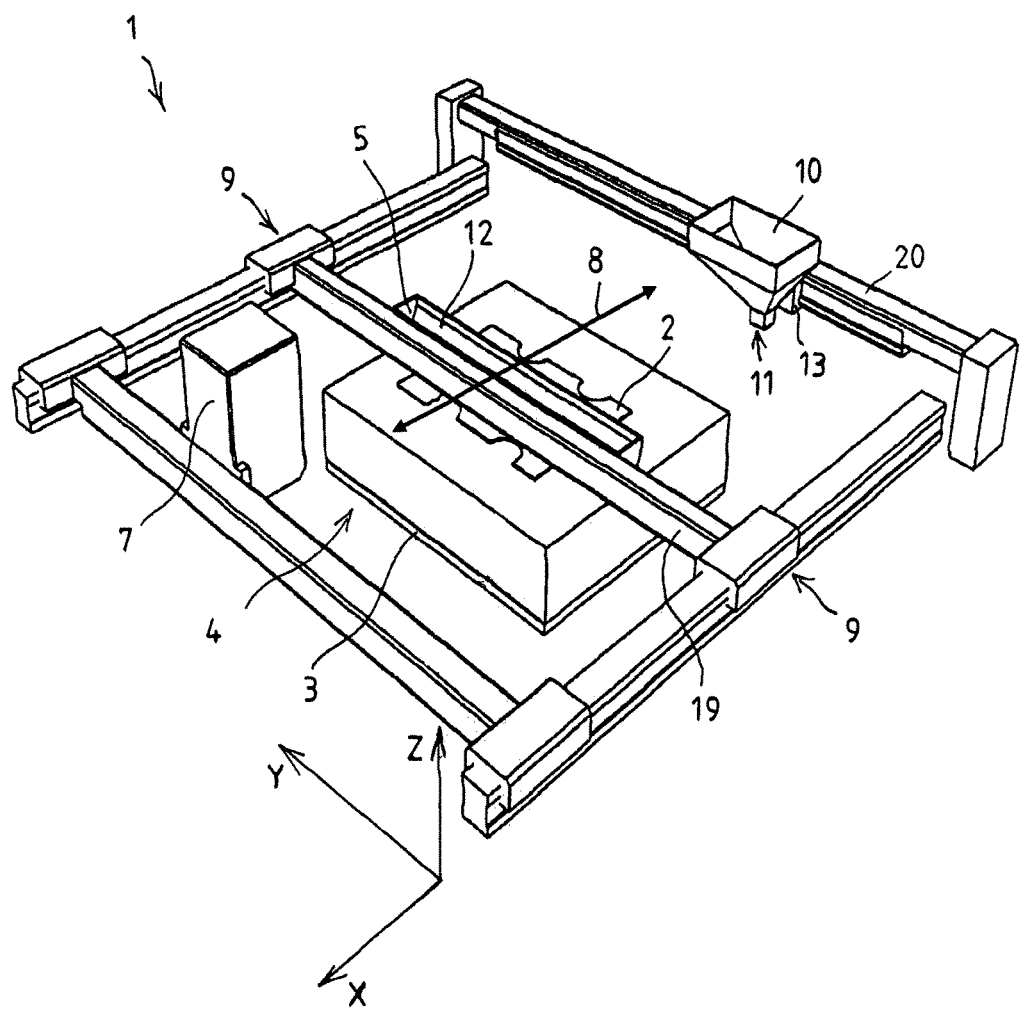
FIG. 1a shows a perspective view of one preferred embodiment of a device for producing moldings on a building platform during a building phase or a coating phase.

FIGS. 1a through 1c and FIGS. 2a and 2b, respectively, show a preferred embodiment of a device 1 for building a layer body or molding 2 from a plurality of superimposed layers of, for example powdered, initially loose, particulate material on a building platform 3 within a build space 4. Build space 4 illustrated in FIGS. 1a through 1c extends over a wide area in FIG. 1 parallel to building platform 3 in the horizontal X and Y directions, layer body 2 being built in the vertical Z direction.

Figure 2A:
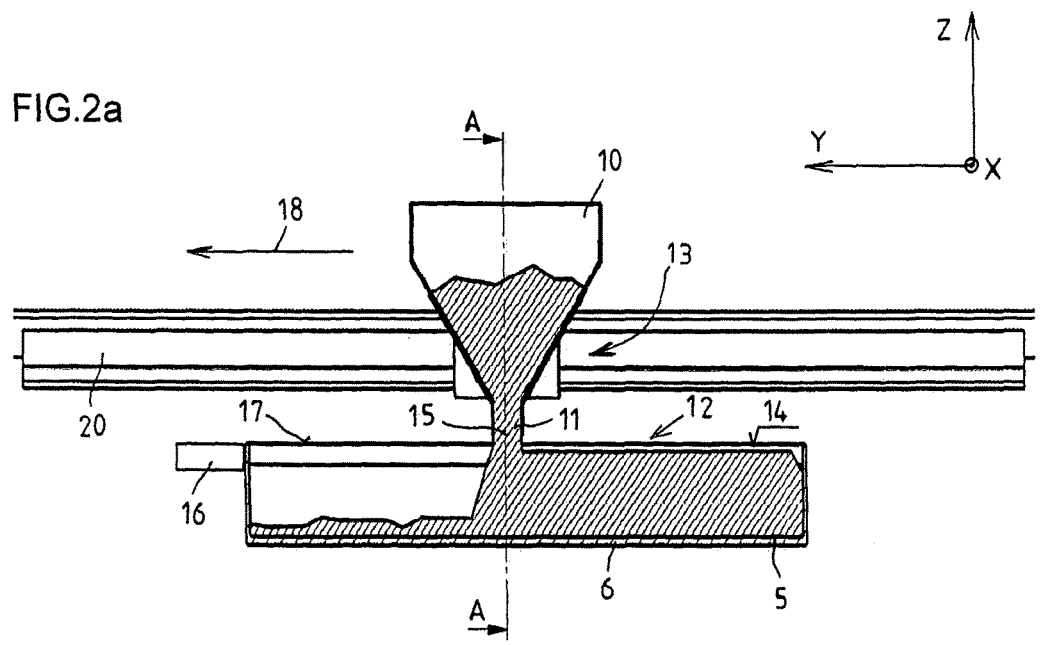
FIG. 2a shows a cross-sectional representation of the device in the position from FIG. 1b.
Figure 2B:
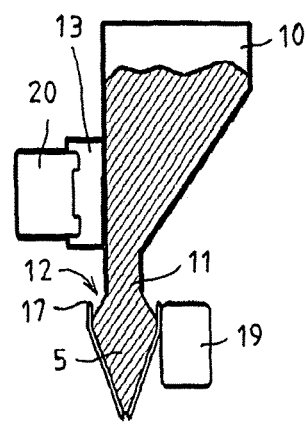
FIG. 2b shows a cross-sectional representation of the device along line A-A from FIG. 2b.

Device 1 comprises a discharging device, which is movable back and forth over build space 4 in at least one discharge direction, in this case, for example, parallel to the X direction, and which includes a discharge container 5 which has a lower discharge opening 6, visible in FIG. 2a and FIG. 2b, from which the particulate material may be discharged in individual superimposed layers during the movement of discharging device or discharge container 5. Discharge container 5 is attached approximately in the center on a guide beam 19, which extends between two linear guides 9, and is able to be moved together with the guide beam along the linear guides in the X direction.

Discharge container 5 is preferably a non-switchable discharge container, i.e., without the option of turning the material flow through the discharge opening on and off, so that free-flowing material or particulate material may or may not flow out. Instead, particulate material flows continuously through the discharge opening in discharge container 5 when this opening is not closed by means not belonging to discharge container 5, or when no (more) particulate material is present in discharge container 5.

Device 1 furthermore comprises a print head 7 which is movable back and forth over build space 4, for example, in the X and Y directions, for the selective application of binder or high energy radiation onto at least one discharged layer in order to solidify and join together discharged layers in locally predetermined areas of build space 4 by the action of a binder or high energy radiation, so that at least layer body 2 is formed by the solidified and joined areas of the layers of the layer body in a known manner.

Alternatively, print head 7 could also be replaced with a radiation source if the discharged, free-flowing material already contains a binder, which is then hardened by selective irradiation with the radiation source for the purpose of forming layer body or molding 2.

The extension of build space 4 in the X and Y directions is predefined by the application of material on building platform 3. If build space 4 is described in illustrated orthogonal coordinate system X-Y-Z, each extension or size of the build space may be represented as a rectangle or square, starting from the origin. The dimensions of building platform 3 in the X and Y directions then correspond to a maximum displayable size of build space 4.

The one side of the rectangle of a build space 4 of this type is generally determined, for example, by the discharge route or the discharge path of discharge container 5 in the discharge direction (X direction) marked by arrow 8 in FIG. 1a, so that, in the present case, the build space size depends on the length of this discharge route. The other side of the rectangle of a build space 4 is determined, for example, by the length of discharge opening 6 of discharge container 5 in the Y direction, which is formed, in particular, by an elongated slot (see FIG. 2a and FIG. 2b).

Different lengths of discharge openings 6 or discharge containers 5 may therefore be provided to generate the sides of the rectangles of build spaces 4 of different lengths in the Y direction. In the present case, therefore, one layer of layer body 2 may, on the whole, be completely produced in one pass of the discharge route in the X direction.

The edges of build space 4 may be formed by printed walls in the X and Y directions, i.e., the particulate material is selectively solidified here by print head 7 so that loose particulate material of layer body 2 situated within the edges of build space 4 is not able to flow off in areas outside build space 4. For this purpose print head 7 suitably prints the edge areas of each discharged layer. Alternatively, however, a separate build container or separate build walls could be used to delimit build space 4.

Figure 3:
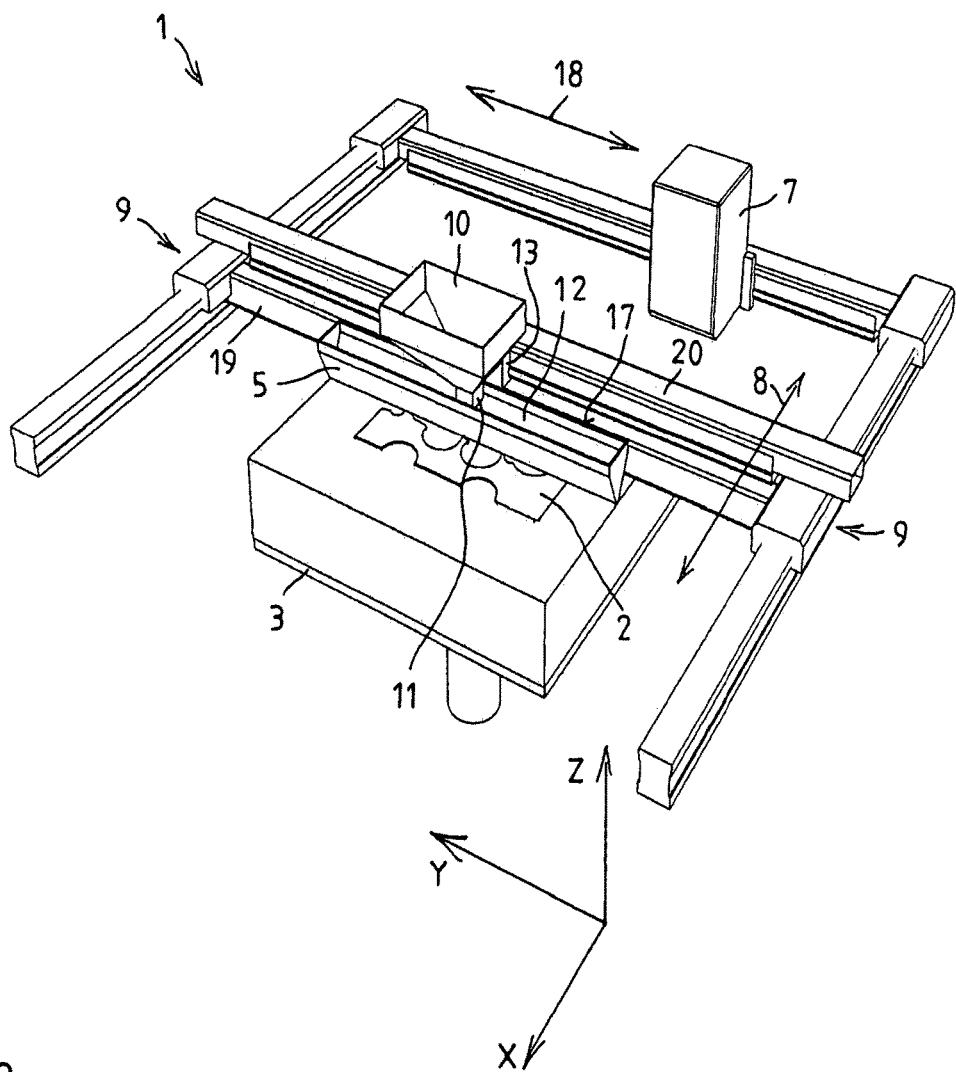
FIG. 3 shows a perspective representation of another embodiment of the device according to the invention.

In the preferred embodiment, building platform 3 is preferably lowered as the height of layer body 2 increases in the Z direction, in particular by means of the drives and guides indicated in the drawing in FIG. 3. Discharge container 5 therefore remains at its initial level for each new layer to be discharged, and it is therefore movable relative to building platform 3 together with its guiding beam 19 along linear guides 9, for example only in the X direction. Alternatively, building platform 3 could be designed to be stationary, and discharge container 5 could be designed to be movable relative to stationary building platform 3 in both the X and Y directions as well as the Z direction.

As indicated above, discharge container 5 is displacement-controlled, for example, by an electronic control unit, which is not illustrated herein, with regard to a predefined discharge route in the X direction, extending from an initial, starting or idle position (see FIGS. 1b and 1c) at one edge of build space 4 to a reversing position at the opposite edge of build space 4; i.e., in response to a starting command, discharge container 5 first moves from its starting or idle position in the X direction to the reversing position, at which position the direction of movement is automatically reversed, if necessary upon expiry of a certain dwell time at the reversing position. During the movement of discharge container 5 along the discharge route, which simultaneously forms the length of the side of the rectangle of build space 4 visible herein, particulate material is preferably continuously applied to building platform 3 or to a previously layered part of layer body 2 via discharge opening 6. FIG. 1a shows the situation in which discharge container 5 is moved along its discharge route in the X direction and is situated between its starting position and its reversing position.

Discharge container 5 may be supplied with free-flowing material from a storage or filling container 10, which has an outflow opening 11, by vertically covering outflow opening 11 with an elongated feed opening 12 of discharge container 5. Preferably, feed opening 11 of discharge container 5 essentially extends over the entire length of discharge container 5 (Y direction), if the side walls of discharge container 5 are provided with an appropriately thin design.

Figure 1B:
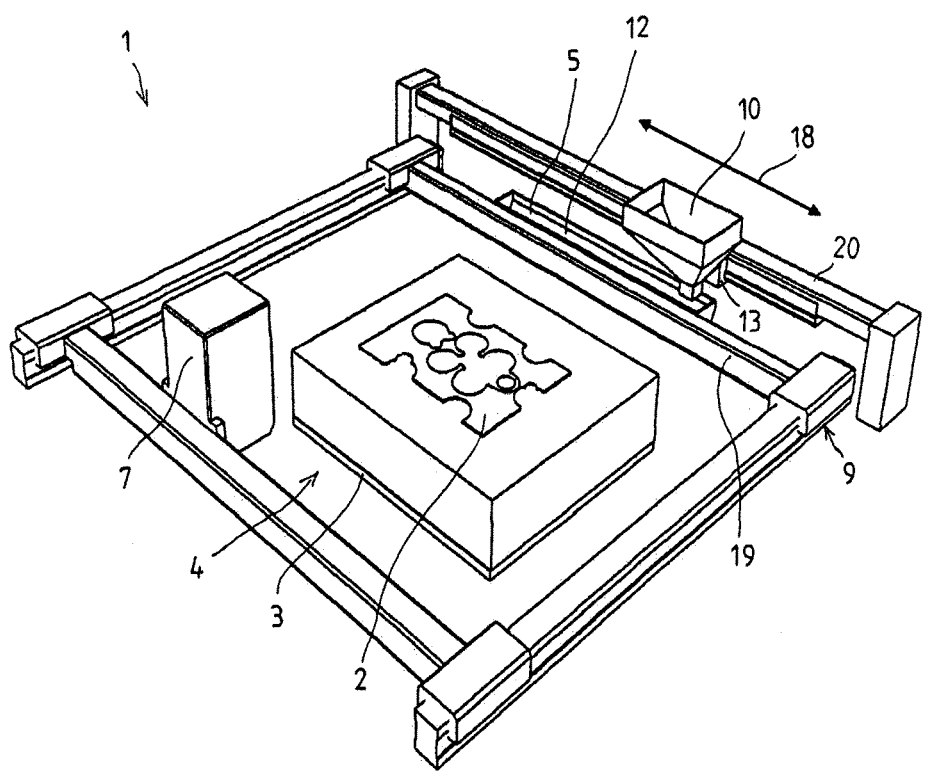
FIG. 1b shows a perspective view of the device from FIG. 1 during a filling phase of the discharge container, a storage or filling container being moved along a discharge route.
Figure 1C:
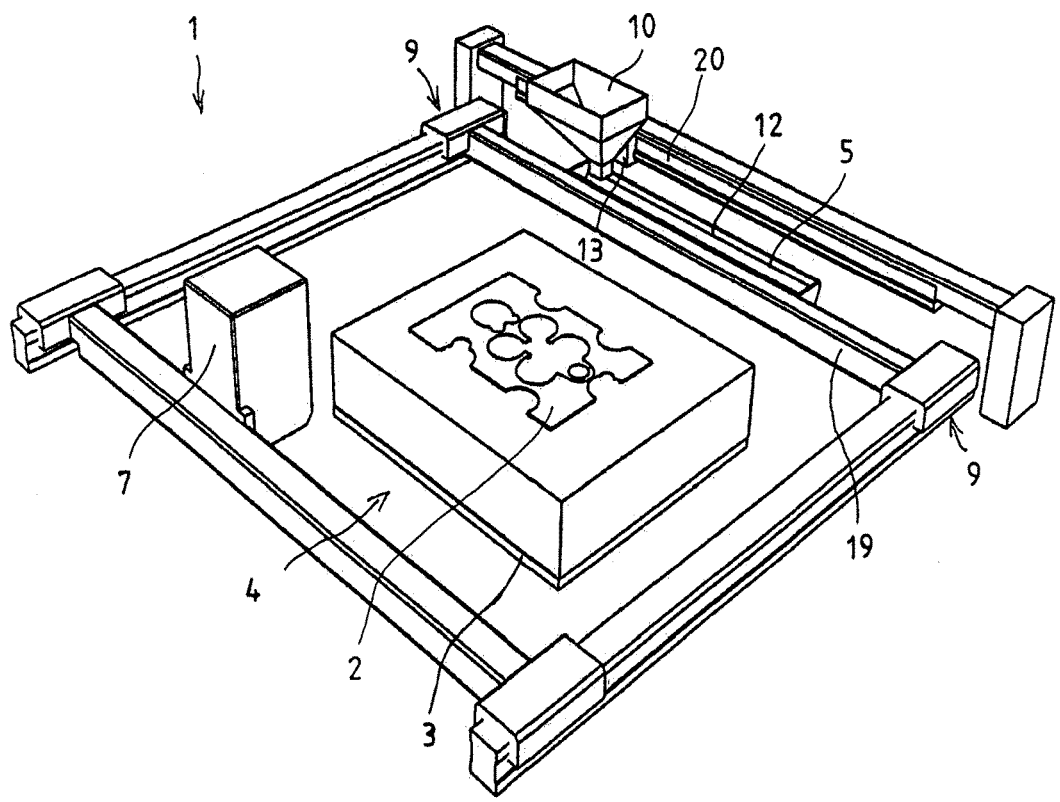
FIG. 1c shows a perspective view of the device from FIG. 1 during a filling phase of the discharge container, the storage or filling container being situated at a reversing position of the discharge route.

In its starting position (FIG. 1b and FIG. 1c), discharge container 5, which in this case is formed, for example, by a discharge hopper 5 having a hopper-shaped cross section on a plane perpendicular to the Y axis (see FIG. 2b), is filled with a quantity of particulate material by storage or filling container 10, the particulate material preferably corresponding to multiple layers to be applied. FIGS. 1b and 1c show the step-by-step filling of discharge container 5 by storage or filling container 10.

As is apparent from FIGS. 1a through 1c, storage or filling container 10 has in this case, for example, a much shorter extension than discharge container 5, viewed in the longitudinal direction of discharge container 5, i.e., in the Y direction or perpendicularly to the discharge direction (X direction) in the figures. Discharge container 5 is preferably longer than storage or filling container 10 by many times the length (Y direction) of storage or filling container 10.

Storage or filling container 10 is furthermore controllable relative to discharge container 5, viewed in the longitudinal direction of discharge container 5 (Y direction), in such a way that outflow opening 11 of storage or filling container 10 is guided along feed opening 12, at least once from the one end thereof to the other end thereof. This movement is illustrated by arrow 18 in FIG. 1b.

Storage or filling container 10 is particularly preferably positively controlled along a discharge route extending between its starting position (see FIG. 1b), at the one end of feed opening 12 of discharge container 5, and a reversing position (see FIG. 1c) at the other end of feed opening 12 of discharge container 5. According to FIG. 1b, the starting position of storage or filling container 10 is preferably a filling position, at which storage or filling container 10 is fillable or refillable with free-flowing material with the aid of a filling device, which is not illustrated herein.

As is apparent in FIGS. 1a through 2b, storage or filling container 10 is guided relative to discharge container 5 along a guide beam 20 by a linear guide 13 and is driven by a drive motor, which is not illustrated herein. The rotary motion of the drive motor is converted to a linear motion of storage or filling container 10 with the aid of a gear, for example a lead screw drive. The drive motor is controlled, for example, by an electronic control unit, which also controls, for example, discharge container 5 along its discharge route. In this embodiment, guide beam 20 is disposed in a stationary manner at one end of device 1, while storage and filling container 10 is guided linearly on guide beam 20 with the aid of linear guide 13.

It is apparent from FIG. 2a and FIG. 2b that outflow opening 11 of storage or filling container 10 is situated at a level which is essentially situated at a fill level 14 to be attained for the free-flowing material in the discharge container in order to close this outflow opening 11 at the current position of outflow opening 11 on the discharge route when the free-flowing material discharged into discharge container 5 along a section of the discharge route already traveled reaches fill level 14 to be attained. A so-called "material cone seal" is thus implemented, in which a material cone 15, discharged through outflow opening 11, of the free-flowing material already discharged into discharge container 5 prevents further outflow at the current position of the discharge route due to a buildup of material, and additional free-flowing material may flow out only when storage and filling container 10 moves forward until material cone 15 again prevents the outflow at this position then reached.

To avoid the loss of free-flowing material when storage or filling container 10 has reached or passed slightly beyond the reversing position (FIG. 1c) and there is the danger of outflow opening 11 of storage and filling container 10 no longer being situated (completely) over feed opening 12 of discharge container 5, a closing member 16 may be disposed in the area of the reversing position (FIG. 1c) of storage or filling container 10 or a short distance beyond in such a way that closing member 16 closes outflow opening 11 when outflow opening 11 of storage or filling container 10 is positioned over closing member 16.

Closing member 16 is preferably a planar, plate-shaped body, for example a metal sheet with or without a through-opening, depending on whether it is intended to prevent a discharge out of the outflow opening of storage and filling container 10 or whether it is to facilitate a discharge into a collecting container disposed below closing member 16, which is not illustrated herein.

If storage and filling container 10 is situated at the reversing position (FIG. 1c) with its outflow opening 11 precisely above closing member 16, outflow opening 11 is closed by closing member 16, as is easily apparent on the basis of FIG. 2a.

Storage or filling container 10, which is longitudinally movable relative to discharge container 5, is particularly preferably fillable, dimensioned and/or controlled in such a way that discharge container 5 is fillable to fill level 14 to be attained based on a single one-way trip of storage or filling container 10 from its starting position (FIG. 1b) to its reversing position (FIG. 1c). Alternatively, a single round trip of storage or filling container 10 from its starting position (FIG. 1b) to its reversing position (FIG. 1c) and back or even multiple trips along the discharge route may also be necessary for this purpose.

According to the embodiment in FIGS. 2a and 2b, storage or filling container 10 is disposed in a stationary manner, viewed in the discharge direction or in the longitudinal direction of discharge container 5, and discharge container 5 is able to pass under storage or filling container 10, as illustrated in FIGS. 1a through 1c.

In the embodiment illustrated in FIG. 3, components that are identical to or have similar functions as the embodiment described above are marked by the same reference numerals. In contrast to the preceding exemplary embodiment, storage or filling container 10 is movable together with discharge container 5, viewed in discharge direction 8 of discharge container 5. This is implemented, for example, by the fact that guide beam 20, including linear guide 13, the drive motor and the gear for storage or filling container 10, is disposed on guide beam 19 guided by linear guides 9 for discharge container 5 and is therefore able to move together with this guide beam 19 in discharge direction 8. Storage or filling container 10 is furthermore movable relative to guide beam 20 with the aid of linear guide 13 in the Y direction or in the direction of arrow 18, i.e., perpendicularly to discharge direction 8.

In this case, storage or filling container 10 is preferably positioned relative to discharge container 5, viewed in the vertical direction, in such a way that the level of outflow opening 11 of storage or filling container 10 is disposed under the level of an upper edge 17 of feed opening 12 of the discharge container 5. This effectively prevents an outflow of feedstock material to the outside of discharge container 5 or on edge 17 thereof.

For example, storage or filling container 10 may have a hopper-shaped cross section, outflow opening 11 being disposed on the end of the hopper. The cross section of storage and feed container 10 is particularly preferably provided with a hopper-shaped design, both on a plane perpendicular to the longitudinal extension of discharge container 5 (Y direction) and on a plane which contains the longitudinal axis of discharge container 5 and is oriented vertically. The cross section of storage or filling container 10 may furthermore be provided with a square or rectangular design on a horizontal plane, in the case of a rectangular cross section, the longer side being disposed parallel to discharge container 5 and yet shorter than the design thereof. This is illustrated, in particular, by FIG. 2a and FIG. 2b.

The outflow of free-flowing material from storage or filling container 10 into the discharge container may preferably take place by means of at least one of the following units, individually or in combination with each other:

a unit for generating pressure and/or vibrations in the free-flowing material stored in the storage or filling container for the purpose of placing the free-flowing material from a non-flowing state into a flowing state, in which it is able to flow through the outflow opening, by introducing pressure and/or vibrations;

a unit for either opening or closing the at least one outflow opening of the storage or filling container;

a unit for activating and deactivating a suction acting upon the free-flowing material stored in the storage or filling container, in such a way that when the suction is activated, the free-flowing material is prevented, on the one hand, by a sieve-like or fabric-like structure, from flowing out in the direction of the suction and, on the other hand, from flowing out through the at least one outflow opening;

when the suction is deactivated, the free-flowing material stored in the storage or filling container flows out through the outflow opening;

a rotary feeder unit.

A cleaning device, which is not illustrated herein, for the underside of or for discharge opening 6 of discharge container 5 is advantageously attached to storage or filling container 10 movable relative to discharge container 5. The cleaning device then moves together with storage and filling container 10 as one structural unit.

Instead of only one outflow opening 11, storage and filling container 10 may also have multiple outflow openings 11 of this type.

LIST OF REFERENCE NUMERALS

1 Device
2 Layer body
3 Building platform
4 Build space
5 Discharge container
6 Discharge opening
7 Print head
8 Arrow
9 Linear guide
10 Storage and filling container
11 Outflow opening
12 Feed opening
13 Linear guide
14 Fill level
15 Material cone
16 Closing member
17 Upper edge 18 Arrow
19 Guide beam
20 Guide beam

What is claimed is:

1. A device for building a layer body from a plurality of individual superimposed layers of a free-flowing material, in particular a particulate material, the layer body on a building platform in a build space, the layers being solidified and joined to each other in locally predetermined areas resulting in solidified and joined areas, so that at least one layer body is formed by the solidified and joined areas of the layers, the device including an elongated discharge container, which is movable back and forth over the build space in at least one discharge direction and which has at least one discharge opening from which the free-flowing material is dischargeable in individual superimposed layers during the movement of the discharge container, it being possible to supply the discharge container with free-flowing material from a filling unit with at least one storage or filling container having at least one outflow opening by vertically covering the at least one outflow opening of the storage or filling container with an elongated feed opening of the discharge container, characterized in that
   a. the storage or filling container has a shorter extension than the discharge container, viewed in a longitudinal direction of the discharge container; and
   b. the device includes a drive unit for moving the storage or filling container along the longitudinal direction of the discharge container from one end of the feed opening to an other end of the feed opening while filling the discharge container by transferring the particulate material from the outflow opening of the storage or filling container to the feed opening of the discharge device.

2. The device of claim 1, characterized in that the storage or filling container is controlled along a discharge route extending between a starting position at the one end of the feed opening of the discharge container and a reversing position at the other end of the feed opening of the discharge container.

3. The device of claim 2, characterized in that the at least one outflow opening of the storage or filling container is disposed at a level which essentially lies at a fill level to be attained for the free-flowing material in the discharge container, in order for the at least one outflow opening to be closed at the current position of this at least one outflow opening on the discharge route when the free-flowing material already discharged into the discharge container along a section of the discharge route already traveled reaches the fill level to be attained.

4. The device of claim 2, characterized in that the starting position of the storage or filling container is a filling position at which the storage or filling container is fillable or refillable with free-flowing material with the aid of a filling unit.

5. The device of claim 2, characterized in that a closing member is disposed in the area of the reversing position of the storage or filling container in such a way that the closing member closes the outflow opening when the at least one outflow opening of the storage or filling container is positioned over the closing member, in order to prevent an outflow of free-flowing material from the storage or filling container past the feed opening of the discharge container in the reversing position.

6. The device of claim 2, characterized in that the storage or filling container, which is movable relative to the discharge container, is filled, dimensioned and/or controlled in such a way that the discharge container is fillable up to a fill level to be attained, based on a single one-way trip from the starting position to the reversing position, based on a single round trip from the starting position to the reversing position and back or based on multiple trips along the discharge route.

7. The device of claim 1, characterized in that the feed opening of the discharge container extends over the entire length of the discharge container.

8. The device of claim 1, characterized in that the storage or filling container is disposed in a stationary manner, viewed in the discharge direction of the discharge container, and the discharge container is able to pass under the storage or filling container.

9. The device of claim 1, characterized in that the storage or filling container is movable together with the discharge container, viewed in the discharge direction of the discharge container.

10. The device of claim 9, characterized in that the storage or filling container is positioned relative to the discharge container, viewed in the vertical direction, in such a way that a level of the at least one outflow opening of the storage or filling container is disposed under a level of an upper edge of the feed opening of the discharge container.

11. The device of claim 1, characterized in that the storage or filling container has a hopper-shaped cross section, wherein at least one outflow opening being disposed on an end of the hopper.

12. The device of claim 1, characterized in that the outflow of free-flowing material from the storage or filling container into the discharge container takes place with the aid of at least one of the following units, individually or in combination:
   a) a unit for generating pressure and/or vibrations in the free-flowing material stored in the storage or filling container for the purpose of placing the free-flowing material from a non-flowing state into a flowing state, in which it is able to flow through the at least one outflow opening, by introducing pressure and/or vibrations;
   b) a unit for either opening or closing the at least one outflow opening of the storage or filling container;
   c) a unit for activating and deactivating a suction acting upon the free-flowing material stored in the storage or filling container, in such a way that
      c1) when the suction is activated, the free-flowing material is prevented, on the one hand, by a sieve-like or fabric-like structure, from flowing out in the direction of the suction and, on the other hand, from flowing out through the at least one outflow opening;
      c2) when the suction is deactivated, the free-flowing material stored in the storage or filling container flows out through the at least one outflow opening;
   d) a rotary feeder unit.

13. The device of claim 1, characterized in that the storage or filling container is guided relative to the discharge container along a linear guide and is driven by driving means.

14. The device of claim 1, characterized in that a cleaning device for the discharge opening of the discharge container is attached to the storage or filling container movable relative to the discharge container.

15. The device of claim 3, wherein the starting position of the storage or filling container is a filling position at which the storage or filling container is fillable or refillable with free-flowing material with the aid of a filling unit; and
   wherein a closing member is disposed in the area of the reversing position of the storage or filling container in such a way that the closing member closes the outflow opening when the at least one outflow opening of the storage or filling container is positioned over the closing member, in order to prevent an outflow of free-flowing material from the storage or filling container past the feed opening of the discharge container in the reversing position.

16. The device of claim 15, wherein the storage or filling container, which is movable relative to the discharge container, is filled, dimensioned and/or controlled in such a way that the discharge container is fillable up to a fill level to be attained, based on a single one-way trip from the starting position to the reversing position, based on a single round trip from the starting position to the reversing position and back or based on multiple trips along the discharge route; and wherein the feed opening of the discharge container extends over the entire length of the discharge container.

17. The device of claim 16, wherein the storage or filling container is disposed in a stationary manner, viewed in the discharge direction of the discharge container, and the discharge container is able to pass under the storage or filling container.

18. The device of claim 16, wherein the storage or filling container is movable together with the discharge container, viewed in the discharge direction of the discharge container.

19. The device of claim 18, wherein the storage or filling container is positioned relative to the discharge container, viewed in the vertical direction, in such a way that a level of the at least one outflow opening of the storage or filling container is disposed under a level of an upper edge of the feed opening of the discharge container.

20. The device of claim 16, wherein the storage or filling container has a hopper-shaped cross section, the at least one outflow opening being disposed on the end of the hopper.

21. A method of producing a layer body comprising steps of:
repeatedly applying layers of a particulate material from a discharge container of a discharge unit onto a build surface;
solidifying and joining the particulate material in locally predetermined areas to form the layer body; and
refilling the discharge container with the particulate material by moving a filling container along an extended fill opening of the discharge unit while material flows from an outflow opening of the filling container into only a portion of the fill opening of the discharge unit; wherein the moving of the filling container allows the entire filling container to be filled.

* * * * *